United States Patent [19]

Kotch

[11] Patent Number: 4,838,365
[45] Date of Patent: Jun. 13, 1989

[54] SEAL ASSEMBLY FOR ROTARY DRILL BITS

[75] Inventor: Robert J. Kotch, Humble, Tex.
[73] Assignee: Reed Tool Company, Houston, Tex.
[21] Appl. No.: 186,022
[22] Filed: Apr. 25, 1988
[51] Int. Cl.$^4$ ............................................. E21B 10/22
[52] U.S. Cl. .................................. 175/371; 277/84; 277/92; 277/93 SD
[58] Field of Search ............... 175/371, 372; 277/92, 277/83, 84, 93 SD; 384/93

[56] References Cited

U.S. PATENT DOCUMENTS

| | | | |
|---|---|---|---|
| 3,502,343 | 3/1970 | Pustelnik | 277/84 |
| 3,572,452 | 3/1971 | Winberg | 175/371 |
| 3,588,127 | 6/1971 | Coleman | 277/92 |
| 3,645,591 | 2/1972 | Winberg | 308/187.1 |
| 4,172,502 | 10/1979 | van Nederveen | 175/372 |
| 4,176,848 | 12/1979 | Lafuze | 277/92 |
| 4,199,156 | 4/1980 | Oldham et al. | 277/92 |
| 4,359,111 | 11/1982 | Gonzalez | 175/372 |
| 4,466,622 | 8/1984 | Deane et al. | 277/92 |
| 4,516,641 | 5/1985 | Burr | 175/228 |
| 4,605,234 | 8/1986 | Metcalf | 277/93 SD |
| 4,613,005 | 9/1986 | Olsson | 175/371 |
| 4,629,338 | 12/1986 | Ippolito | 175/371 |
| 4,671,368 | 6/1987 | Burr | 277/92 |

OTHER PUBLICATIONS

Sandia Laboratories, Sand 80–7101, Unlimited Release, UC-66c, Jul. 1980, FIG. 9.

Primary Examiner—Jerome W. Massie, IV
Assistant Examiner—Terry Lee Melius
Attorney, Agent, or Firm—Dodge Bush & Moseley

[57] ABSTRACT

A seal assembly for a roller cutter bit mounted in an annular cavity between a roller cutter and a journal. A mechanical spring on the roller cutter urges in an axial direction sealing faces on respective rigid seals into sealing engagement with each other against the bias of an opposed to elastomeric seal. Even upon permanent or compression set of elastomeric seal, the sealing force is maintained by the mechanical seal against the sealing faces on the rigid annular rings.

3 Claims, 2 Drawing Sheets

SEAL ASSEMBLY FOR ROTARY DRILL BITS

BACKGROUND OF THE INVENTION

This invention relates to a seal assembly for a roller cutter drill bit and more particularly to such a seal assembly positioned between sealing surfaces on a journal of the bit body and a roller cutter mounted on the journal for rotation.

A roller cutter drill bit includes the roller cutter mounted for rotation on a bearing journal of a drill body, and bearing means mounting the roller cutter on the bearing journal. A lubrication system is provided to supply lubricant to the bearing means, and sealing means are normally mounted between the roller cutter and the bearing journal on opposed bearing surfaces thereof to block the flow of lubricant outwardly past the bearing means and to block the passage of foreign matter such as drilling mud with entrained cuttings inwardly to the bearing means.

The sealing means generally employed heretofore has been elastomeric packing ring type seals such as "O" rings for example as shown in U.S. Pat. No. 3,397,927 or radially extended elastomeric rings such as shown in U.S. Pat. No. 3,765,495. These seals have required a large amount of deformation or squeeze when placed between the bearing surfaces of the roller cutter and journal to seal the relatively large clearances, to retain the lubricant within the bearing means, and to prevent the entry of foreign matter past the seal means. When such seals are provided with such a large amount of deformation or squeeze a substantial sliding friction is provided between the elastomeric sealing surface against the relatively rotating surface of the roller cutter or bearing journal. When relatively high rotational speeds are involved, a substantial amount of heat is generated thereby causing wear and decreasing the life of the seal and consequently the bearings.

In an attempt to increase the life of the seals in roller cutter drill bits, metal face seals have been utilized particularly under severe conditions of relatively high rotational speeds, high operating temperatures, or harsh downhole environment such as gasses detrimental to elastomers. One example of metal face seals for roller cutter bits is shown in U.S. Pat. No. 4,671,368 in which seal assemblies are positioned between sealing surfaces on the journal and the roller cutter to seal between relatively large clearances between the roller cutter and the bearing journal. Such a seal assembly has included a pair of rigid annular seals in an annular space between the journal and roller cutter with associated elastomeric seals between the annular rigid seals and adjacent sealing surfaces on the journal and roller cutter. The rigid annular seals are mounted for relative rotation in face to face sealing contact with each other and this sealing relation is maintained by a sealing force resulting from elastomeric seals urging the rigid seals toward each other. Thus, the elastomeric energizer seals provide a continuous sealing force for maintaining the rigid seals in face to face sealing relation with each other. In the event, however, of a permanent or compression set in the elastomeric seals which might occur at relatively high temperatures often prolonged periods of use, the sealing force exerted by the elastomeric seals against the sealing faces of the rigid seals may be reduced thereby providing a less effective seal between the sealing faces of the rigid annular seals.

SUMMARY OF THE INVENTION

This invention is particularly directed to an improved seal assembly for a roller cutter drill bit positioned in an annular space or cavity between sealing surfaces on a journal of the bit body and a roller cutter mounted on the journal for rotation. The improved seal assembly includes a pair of elastomeric seals in combination with a mechanical spring such as a metal compression spring or wave spring, to provide a continuous generally uniform sealing force for urging contacting sealing faces of opposed rigid annular seals into an effective face to face sealing relation and to maintain the effective sealing force against the sealing faces of the rigid seals even upon a permanent set in the elastomeric seals. Such a permanent set may result from high temperatures during prolonged periods of use at high speeds.

The mechanical non-elastomeric spring is exposed only to lubricant as the elastomeric seals which are exposed to the drilling mud block the flow of such drilling mud to the mechanical spring. A mechanical spring such as a coil spring may become ineffective if packed with foreign matter which may occur if exposed to drilling mud with foreign matter or cuttings entrained therein for prolonged periods of time. The metal or metal-like spring provides a generally continuous uniform spring force acting in an axial direction to hold the sealing faces of the rigid seals in face to face contact under a generally uniform sealing force.

The utilization of a mechanical spring in combination with a pair of rigid annular seals and associated elastomeric seals in a rotary drill bit provides the application of a substantial uniform force being exerted against the opposed sealing faces of the rigid seals. The elastomeric seals seal between the associated rigid seals and adjacent sealing surfaces of the roller cutter and journal while isolating the mechanical spring from contact with drilling fluid and entrained foreign matter. The rigid seals are spaced from the adjacent surfaces of the journal and roller cutter a distance sufficient to accommodate a predetermined bearing wear and compression set of the elastomeric seals without bottoming out of the rigid seals against the roller cutter or the journal.

An object of this invention is to provide an improved seal assembly for a roller cutter drill bit utilizing a mechanical spring for urging opposed sealing faces of rigid annular seals into effective face to face sealing relation under a generally uniform sealing force exerted axially against the rigid seals.

A further object is to provide such an improved seal assembly in combination with a pair of elastomeric seals which isolate the mechanical spring from exposure to drilling fluid and entrained cuttings while sealing between the rigid seals and adjacent sealing surfaces of the roller cutter and journal on which the roller cutter is mounted for rotation.

Other objects, features, and advantages of this invention will become more apparent after referring to the following specification and drawings.

DESCRIPTION OF THE INVENTION

Figure 2:
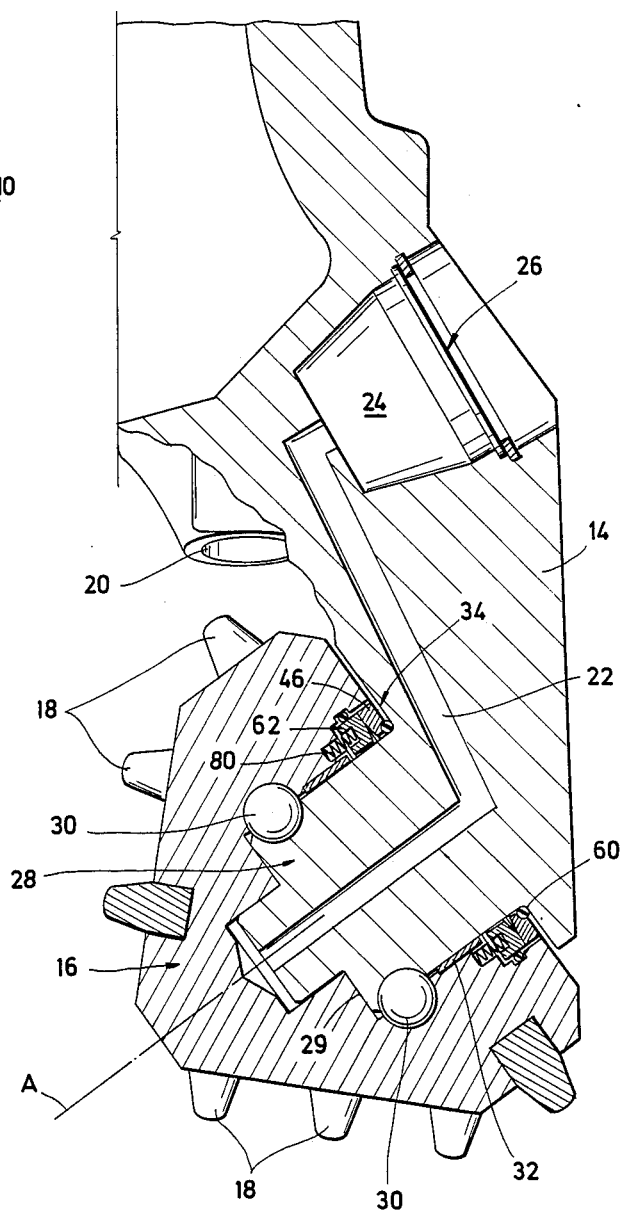
FIG. 2 is a partial longitudinal section view illustrating the mounting of a roller cutter on a journal of a lug forming a segment of a bit body and showing means for lubricating the journal.
Figure 3:
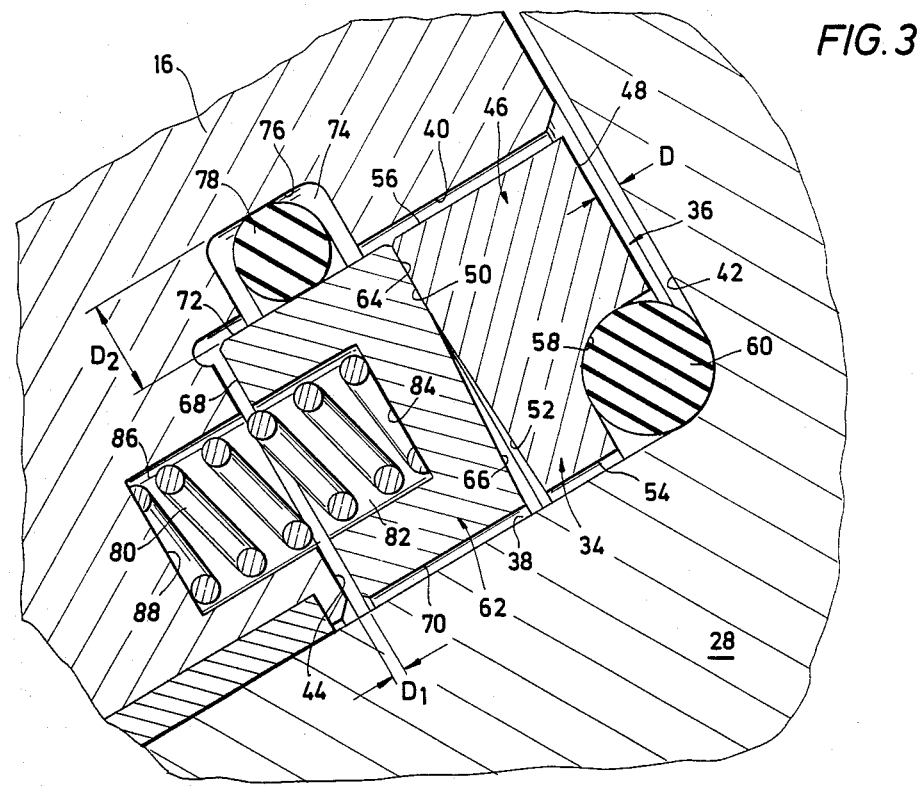
Figure 4:
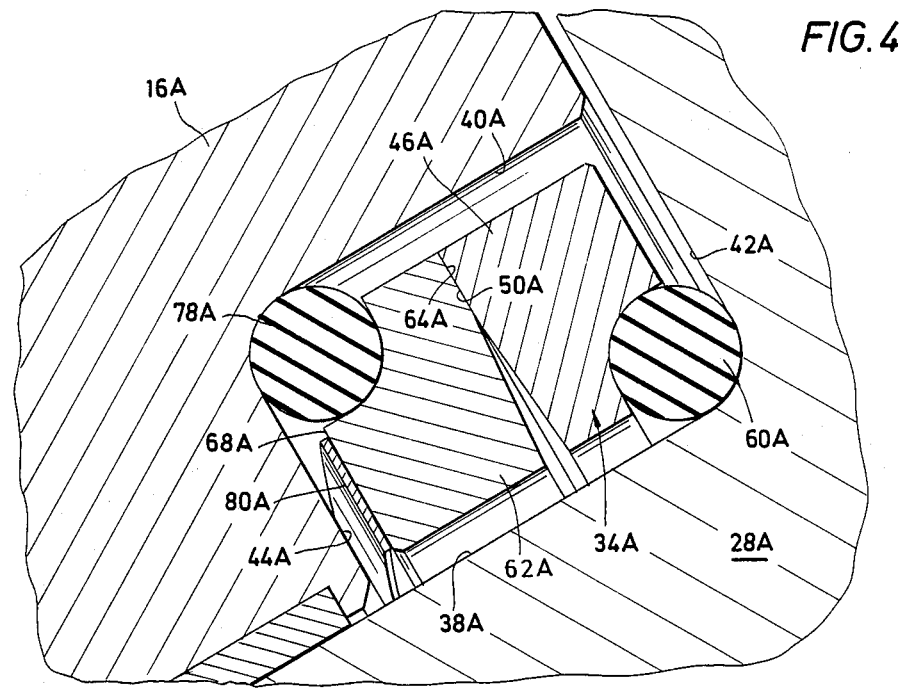

FIG. 3 is an enlarged fragment of FIG. 2 illustrating the improved seal assembly forming the present invention mounted in the annular space or cavity between the roller cutter and the journal; and FIG. 4 is an enlarged section of an additional embodiment of this invention showing a seal assembly utilizing a pair of elastomeric seals in combination with a mechanical spring for urging a pair of rigid annular seals into face to face sealing relation.

Figure 1:
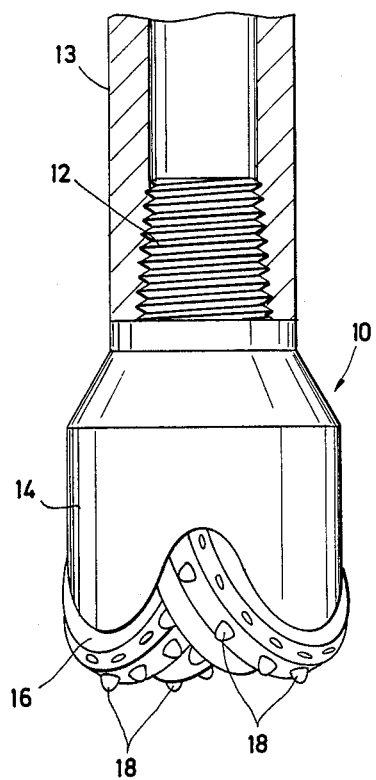
FIG. 1 is an elevation of a rotary drill bit showing a plurality of rotary cutters mounted on an end thereof.

Referring now to the drawings for a better understanding of the invention and more particularly to FIGS. 1 and 2, a typical rotary drill bit is illustrated generally at 10 having a threaded upper end at 12 which may be connected to the lower end of a drill string illustrated generally at 13 for drilling an oil well or the like. Rotary drill bit 10 is normally formed of three elongated body sections or lugs indicated at 14 which are welded together to form a completed bit body. Each body section or lug 14 has a roller cutter 16 mounted thereon for rotation. Roller cutter 16 has cutting teeth 18 thereon for engaging in cutting relation a formation to be drilled. Drilling fluid from drill string 13 is supplied through suitable nozzles 20 to aid in the cutting operation as well known in the art.

A lubricant channel is shown at 22 which communicates with a lubricant reservoir 24 having a pressure compensator indicated generally at 26 therein to equalize the pressure of the lubricant inside the bearing cavity and the hydrostatic pressure of the drilling mud outside bit 10. At the end of each lug 14 a bearing journal generally indicated at 28 is shown for mounting roller cutter 16 thereon for rotation about an axis A and an annular bearing face 29. Ball bearings 30 and a floating journal bushing 32 are mounted between roller cutter 16 and journal 28 as well known in the art.

The improved seal assembly forming an important part of this invention is illustrated generally at 34 and is mounted between cutter 16 and journal 28 to hold the lubricant within roller cutter 16 and prevent foreign matter such as cuttings entrained with drilling fluid from entering journal 28.

Seal assembly 34 as shown particularly in FIG. 3 fits within the annular cavity or groove 36 formed between roller cutter 16 and journal 28. Annular cavity 36 is defined between respective spaced cylindrical axial surfaces 38 and 40 of journal 28 and roller cutter 16, and respective planar radial surfaces 42 and 44 of journal 28 and roller cutter 16. A rigid annular journal seal is shown generally at 46 defining a rear face 48 in opposed relation to radial surface 42 of journal 28, a front face 50 defining a sealing face including a tapered inner marginal circumferential portion 52, an inner axial face 54 in opposed parallel relation to axial face 38 on journal 28, and an opposed axial face 56 opposite axial surface 40 on roller cutter 16. Radial surface 42 and rear face 48 are spaced a distance D from each other. Rigid seal 34 has a notched inner corner forming a groove 58 for receiving an elastomeric O-ring 60 therein sealing between rigid seal 46 and adjacent surfaces 38 and 42 of journal 28.

A rigid annular cutter seal is generally indicated at 62 and has a rear sealing face 64 in sealing contact with opposed sealing face 50 on annular seal 46 and includes a tapered inner circumferential marginal portion 66 in opposed spaced relation to marginal portion 52 of adjacent face 50. The spacing of marginal positions 52 and 66 provides a space to receive lubricant. A front radial face 68 is spaced a distance D1 from opposed radial surface 44 on roller cutter 6. Rigid seal 62 has an inner axial face 70 spaced from axial face 38 on journal 28 and an outer axial face 72 spaced from axial surface 40 on cutter 16. An annular groove 74 is provided in axial surface 40 of roller cutter 16 and defines a bottom surface 76 with groove 74 receiving an O-ring 78 therein which seals between bottom surface 76 and axial surface 72 of rigid seal 62. Bottom surface 76 is spaced from axial surface 72 a distance D2 as shown in FIG. 3.

To maintain sealing faces 50 and 64 in sealing contact with each other under a predetermined sealing force even after prolonged periods at use at relatively high temperatures, such as 300° F., for example, which sometimes result in a permanent set of elastomeric seals, a mechanical or non-elastomeric spring is shown at 80 as a coil metal spring for urging sealing faces 50 and 64 together in sealing contact and for compressing O-ring 60 against surface 42 a predetermined amount. Four (4) springs 80 spaced at 90° intervals about the circumference of rigid ring 62 have been found to function effectively although a greater number of springs 80 could be employed if desired particularly for large diameter roller cutters. Rigid ring 62 has a bore 82 therein defining a bottom surface 84 and roller cutter 16 has an opposed axially aligned bore 86 therein defining a bottom surface 88. Spring 80 is received within axially aligned bores 82, 86 and is biased between bottom surfaces 84 and 88 under a predetermined compression.

By mounting springs 80 on roller cutter 16, springs 80 are exposed only to lubricant not to a drilling fluid and entrained cuttings or foreign matter as in the areas adjacent surfaces 40 and 42 between O-rings 60 and 78. Lubricant does not affect the functioning of mechanical springs such as wave springs, Belleville springs, or coil springs, but oftentimes exposure of mechanical springs to drilling fluid with entrained cuttings or foreign matter will affect the effective functioning of the mechanical springs particularly if foreign matter becomes packed within or adjacent the springs to restrict adequate movement of the springs. While the mechanical springs normally are formed of metal or a metallic material, certain nonelastomeric materials which exhibit elastic properties similar to those of metals would function effectively such as ceramic materials for example.

The following spacing for D, D1, and D2 is desired for satisfactory functioning of sealing assembly 34 forming this invention, particularly upon prolonged periods of use at high rotational speeds and relatively high temperatures. The clearance or space D is greater than a predetermined permanent set of elastomeric seal 60 and the wear on bearing face 29 of journal 28. Distance D1 is greater than zero when cutter 16 is thrust outwardly on bearing journal 28 to provide a clearance between faces 44 and 68. Distance D2 is less than the diameter of elastomeric seal for 78 under a predetermined permanent set.

Rigid cutter seal 62, spring 80, and elastomeric seal 78 rotate with roller cutter 16 relative to journal 28 while annular rigid seal 34 and elastomeric seal 60 remain stationary with journal 28. Thus, sealing faces 50 and 64 are in frictional contact with each since ring 62 rotates with roller cutter 16 relative to journal 28 and rigid ring 46. Thus, a generally uniform sealing force is provided by spring 80 against sealing faces 50 and 64 even upon a permanent or compression set of elastomeric O-ring 60 thereby to provide and maintain an effective metal to metal seal upon relatively harsh conditions, such as high rotational speeds and relatively high temperatures.

Referring to FIG. 4, a modified sealing assembly 34A is illustrated as mounted in an annular cavity between roller cutter 16A and journal 28A. A rigid annular journal seal 46A is spaced from adjacent radial surface 42A of journal 28A and annular rigid cutter seal 62A is mounted adjacent radial surface 44A of roller cutter 16A. An elastomeric seal 60A seals between rigid ring 46A and adjacent surfaces 38A and 42A, and an elastomeric ring 78A seals between surface 62A and adjacent surfaces 40A and 44A of roller cutter 60A. A wave spring 80A forms the mechanical spring and is biased between front face 68A of rigid seal 62A and adjacent surface 44A of roller cutter 16A. Thus, wave spring 80A urges sealing face 50A of rigid ring 46A and sealing face 64A of rigid ring 62A together and compresses elastomeric seal 60A against radial face 42A. In the event of a permanent or compression set in elastomeric seal 60A, wave spring 80A will maintain a generally uniform sealing force against faces 50A and 64A. Thus, seal assembly 34A shown in FIG. 4 functions in a manner similar to seal assembly 34 shown in FIGS. 1–3.

Compression set or permanent compression set as used herein is interpreted as the percent of permanent set in the compression of the unrestrained seal after initial assembly. For example, if an O-ring is compressed ten percent upon assembly or an amount equal to ninety percent of its original unrestrained cross-sectional diameter, and after use returns to ninety-five percent of its unrestrained cross-sectional diameter or one-half of its initial compression, then the compression set is fifty percent.

The permanent compression set is dependent on such factors, for example, as the initial compression of the seal, the operating temperature of the seal, the seal material, and the exposure time to the operating temperature.

A permanent compression set in an annular elastomeric seal for a rotary drill bit under certain conditions of loading, rotational speeds, high temperatures, sizes, and prolonged periods of use, for example, may be in the range of around 10–50% which is substantial and can affect the sealing capability of sealing assemblies. Thus, it is highly desirable that a mechanical seal be provided to maintain an adequate axial sealing force against the sealing faces of the rigid annular seals for the journal and roller cutter which seal is not subject to any permanent set during such operating conditions.

While preferred embodiments of the present invention have been illustrated, it is apparent that modifications and adaptations of preferred embodiments will occur to those skilled in the art. However, it is to be expressly understood that such modifications and adaptations are both within the spirit and scope of the present invention asset forth in the following claims.

What is claimed is:

1. A triple cone rotary drill bit for drilling a well bore and comprising:
   a bit body having a threaded upper end adapted to be removably connected to a drill string for rotating the bit and for supplying pressurized drilling fluid to the bit, and three elongated body lugs below said threaded upper end each lug having a bearing journal at the lower extending end thereof;
   nozzles on the bit body for the discharge of drilling fluid in a plurality of streams;
   a roller cutter for each of said three lugs, each roller cutter comprising a generally conical roller cutter body mounted for rotation on an associated bearing journal about the longitudinal centerline of the journal and including a plurality of cutting elements extending about the cutter body;
   a lubricant reservoir in said bit body;
   a lubricant channel between said lubricant reservoir and said associated bearing journal for supplying lubricant to said bearing journal;
   pressure compensating means for equalizing the pressure of the lubricant adjacent the bearing journal and the hydrostatic pressure of the drilling fluid outside said drill bit;
   an annular space formed in said generally conical roller cutter body adjacent the juncture of said bearing journal and associated lug, said annular space being of a generally rectangular cross-section to define generally opposed spaced concentric planar radial surfaces on said journal and said roller cutter body, and generally opposed spaced cylindrical axial surfaces on said roller cutter and said associated bearing journal;
   an improved sealing means mounted in said annular space for sealing between the lubricant adjacent the journal and the drilling fluid outside the drill bit and including:
   a first rigid annular seal in said annular space for said roller cutter adjacent said planar radial surface on said roller cutter;
   a first elastomeric seal for said roller cutter positioned and sealing between said first rigid seal and said cylindrical axial surface on said roller cutter;
   a second rigid annular seal in said annular space for said journal adjacent said planar radial surface on said journal and in face-to-face contact with said first rigid seal;
   a second elastomeric seal for said journal positioned and sealing between said second rigid annular seal and said planar axial surface on said journal and normally spacing said second rigid annular seal from said adjacent planar radial surface on said journal; and
   a mechanical spring in contact with said first rigid annular seal and acting in opposed relation to said second elastomeric seal, said mechanical spring being mounted on said roller cutter in spaced relation to and between said opposed cylindrical planar axial surfaces for rotation with said roller cutter, said rigid seals being mounted for floating back and forth axial movement between said compression spring and said second elastomeric seal and being urged continuously thereby in an axial direction into fact to face sealing contact with each other for compressing said second elastomeric seal into sealing engagement with said radial planar surface on said journal, said second annular rigid seal being spaced axially from the adjacent planar radial surface of said journal a distance sufficient to accommodate permanent compression set of said second elastomeric seal and radial journal wear.

2. In a rotary drill bit as set forth in claim 1 wherein said mechanical spring comprises a metal coil spring and said roller cutter and first rigid seal have axially aligned recesses therein receiving said spring for compressing said spring therebetween.

3. In a rotary drill bit as set forth in claim 1 wherein said mechanical spring comprises a wave spring between said roller cutter and said first rigid annular seal.

* * * * *